US012587538B2

(12) United States Patent
Loose, Jr. et al.

(10) Patent No.: US 12,587,538 B2
(45) Date of Patent: Mar. 24, 2026

(54) TECHNIQUES FOR ACCESS CERTIFICATION REVIEWER SELECTION

(71) Applicant: Okta, Inc., San Francisco, CA (US)

(72) Inventors: Richard Elmer Loose, Jr., South Lake Tahoe, CA (US); Ryan Michael Sullivan, San Diego, CA (US); Vijayaraghavan Kodaganallur Pitchumani, Fremont, CA (US)

( * ) Notice: Subject to any disclaimer, the term of this patent is extended or adjusted under 35 U.S.C. 154(b) by 435 days.

(21) Appl. No.: 17/811,020

(22) Filed: Jul. 6, 2022

(65) Prior Publication Data

US 2024/0015161 A1    Jan. 11, 2024

(51) Int. Cl.
*H04L 9/40*         (2022.01)

(52) U.S. Cl.
CPC ................................. *H04L 63/104* (2013.01)

(58) Field of Classification Search
CPC .................................................... H04L 63/104
See application file for complete search history.

(56) References Cited

U.S. PATENT DOCUMENTS

| | | | | |
|---|---|---|---|---|
| 11,080,803 | B2 * | 8/2021 | Sittig ..................... | H04W 4/021 |
| 2003/0236976 | A1 * | 12/2003 | Wheeler ................. | H04L 63/20 |
| | | | | 713/158 |
| 2010/0121954 | A1 * | 5/2010 | Yang ...................... | H04L 63/101 |
| | | | | 709/225 |
| 2015/0381629 | A1 * | 12/2015 | O'Sullivan ........... | H04L 63/102 |
| | | | | 726/4 |
| 2019/0236659 | A1 * | 8/2019 | Polizzotto .......... | G06Q 30/0279 |
| 2019/0286795 | A1 * | 9/2019 | Bhatt ................... | H04L 63/0421 |
| 2020/0293541 | A1 * | 9/2020 | Pigeon .................... | H04L 67/34 |
| 2021/0281572 | A1 * | 9/2021 | Fernandez-Spadaro ..................... | |
| | | | | H04L 63/083 |
| 2024/0187218 | A1 * | 6/2024 | Fong ..................... | H04L 9/3247 |

* cited by examiner

*Primary Examiner* — Mohammed Waliullah
(74) *Attorney, Agent, or Firm* — Holland & Hart LLP

(57)         ABSTRACT

Methods, systems, and devices for discounting extensibility latency are described. A software platform may identify a first time period of a campaign to certify access to one or more resources for a plurality of users. The software platform may determine, for each user of the multiple of users, one or more criteria associated with the campaign that are satisfied by respective information associated with each user. The software platform may select, for each user of the multiple users, a reviewer to certify access to the one or more resources for a respective user based on the one or more criteria.

20 Claims, 7 Drawing Sheets

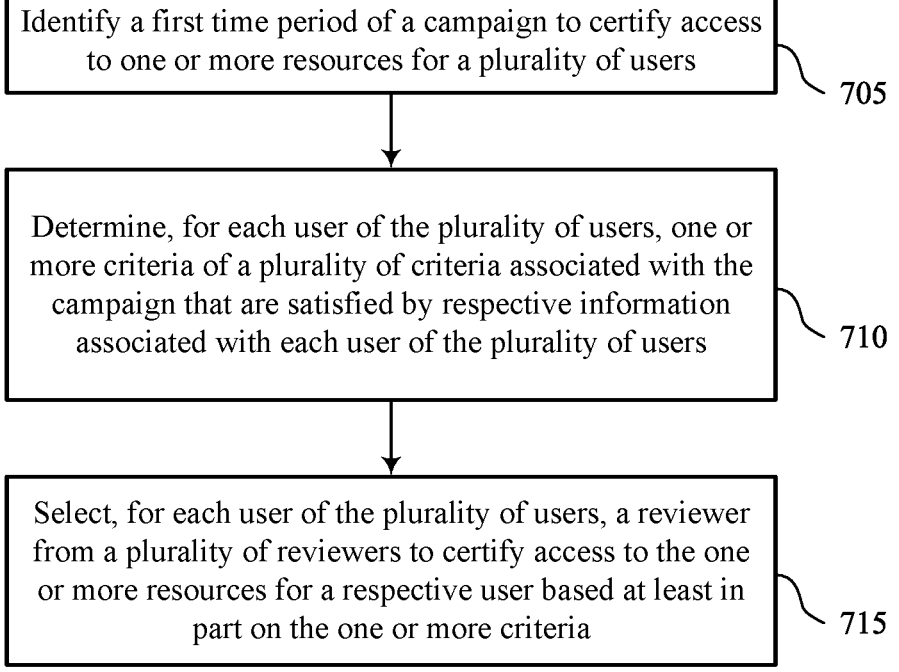

Identify a first time period of a campaign to certify access to one or more resources for a plurality of users

705

Determine, for each user of the plurality of users, one or more criteria of a plurality of criteria associated with the campaign that are satisfied by respective information associated with each user of the plurality of users

710

Select, for each user of the plurality of users, a reviewer from a plurality of reviewers to certify access to the one or more resources for a respective user based at least in part on the one or more criteria

TECHNIQUES FOR ACCESS CERTIFICATION REVIEWER SELECTION

FIELD OF TECHNOLOGY

The present disclosure relates generally to access management, and more specifically to techniques for access certification reviewer selection.

BACKGROUND

An organization may provide users of the organization with access to resources, such as software applications, that may be reviewed for security purposes, compliance, or license management, among other examples. Organizations that include several users must therefore manage several different access privileges. The necessity of managing identity and access privileges for several users may impose a considerable burden on the organizations.

In some cases, organizations may use tools, such as identity governance and administration (IGA) tools, to help manage identity and access privileges for users. However, for some use cases, conventional IGA tools may be deficient or sub-optimal in some current configurations.

SUMMARY

The described techniques relate to improved methods, systems, devices, and apparatuses that support techniques for access certification reviewer selection. For example, the described techniques provide a framework for selecting access certification reviewers based on information associated with users of the organization. In some examples, a software platform may identify a first time period of a campaign to certify access to one or more resources for a set of multiple users. The software platform may determine, for each of the multiple users, criteria that are associated with the campaign and satisfied by respective information associated with each of the multiple users. The software platform may select a respective reviewer from a set of multiple reviewers to certify access to the one or more resources for each of the multiple users based on the criteria.

A method for access management is described. The method may include identifying a first time period of a campaign to certify access to one or more resources for a set of multiple users, determining, for each user of the set of multiple users, one or more criteria of a set of multiple criteria associated with the campaign that are satisfied by respective information associated with each user of the set of multiple users, and selecting, for each user of the set of multiple users, a reviewer from a set of multiple reviewers to certify access to the one or more resources for a respective user based on the one or more criteria.

An apparatus for access management is described. The apparatus may include a processor, memory coupled with the processor, and instructions stored in the memory. The instructions may be executable by the processor to cause the apparatus to identify a first time period of a campaign to certify access to one or more resources for a set of multiple users, determine, for each user of the set of multiple users, one or more criteria of a set of multiple criteria associated with the campaign that are satisfied by respective information associated with each user of the set of multiple users, and select, for each user of the set of multiple users, a reviewer from a set of multiple reviewers to certify access to the one or more resources for a respective user based on the one or more criteria.

Another apparatus for access management is described. The apparatus may include means for identifying a first time period of a campaign to certify access to one or more resources for a set of multiple users, means for determining, for each user of the set of multiple users, one or more criteria of a set of multiple criteria associated with the campaign that are satisfied by respective information associated with each user of the set of multiple users, and means for selecting, for each user of the set of multiple users, a reviewer from a set of multiple reviewers to certify access to the one or more resources for a respective user based on the one or more criteria.

A non-transitory computer-readable medium storing code for access management is described. The code may include instructions executable by a processor to identify a first time period of a campaign to certify access to one or more resources for a set of multiple users, determine, for each user of the set of multiple users, one or more criteria of a set of multiple criteria associated with the campaign that are satisfied by respective information associated with each user of the set of multiple users, and select, for each user of the set of multiple users, a reviewer from a set of multiple reviewers to certify access to the one or more resources for a respective user based on the one or more criteria.

In some examples of the method, apparatuses, and non-transitory computer-readable medium described herein, determining the one or more criteria may include operations, features, means, or instructions for comparing at least a portion of the respective information associated with each user of the set of multiple users to at least one criterion of the set of multiple criteria.

In some examples of the method, apparatuses, and non-transitory computer-readable medium described herein, each criterion of the set of multiple criteria includes a conditional expression.

In some examples of the method, apparatuses, and non-transitory computer-readable medium described herein, the conditional expression includes business logic.

Some examples of the method, apparatuses, and non-transitory computer-readable medium described herein may further include operations, features, means, or instructions for determining that a default criterion of the set of multiple criteria associated with the campaign may be satisfied by information associated with a user of the set of multiple users and selecting, for the user, a default reviewer from the set of multiple reviewers to certify access to the one or more resources for the user based on the default criterion.

In some examples of the method, apparatuses, and non-transitory computer-readable medium described herein, determining that the default criterion may be satisfied by the information associated with the user may include operations, features, means, or instructions for determining that the selected reviewer includes the user, where selecting the default reviewer may be based on the determination, and where the default reviewer may be different from the user.

Some examples of the method, apparatuses, and non-transitory computer-readable medium described herein may further include operations, features, means, or instructions for transmitting a message indicating, to the selected reviewer, to certify access to the one or more resources for the respective user.

Some examples of the method, apparatuses, and non-transitory computer-readable medium described herein may further include operations, features, means, or instructions for certifying access to the one or more resources includes approving access to at least one resource of the one or more resources, revoking access to at least one resource of the one or more resources, reassigning a user to another reviewer, or a combination thereof.

In some examples of the method, apparatuses, and non-transitory computer-readable medium described herein, the respective information associated with each user of the set of multiple users includes a username of the respective user, a status of the respective user, a title of the respective user, a location associated with the respective user, an organization associated with the respective user, a department associated with the respective user, a cost center associated with the respective user, a manager of the respective user, or a combination thereof.

In some examples of the method, apparatuses, and non-transitory computer-readable medium described herein, the respective information associated with each user of the set of multiple users may be stored in a directory service.

In some examples of the method, apparatuses, and non-transitory computer-readable medium described herein, each user of the set of multiple users may have access to at least one resource of the one or more resources during the first time period.

BRIEF DESCRIPTION OF THE DRAWINGS

FIG. 7 shows a flowchart illustrating methods that support techniques for access certification reviewer selection in accordance with aspects of the present disclosure.

DETAILED DESCRIPTION

Figure 1:
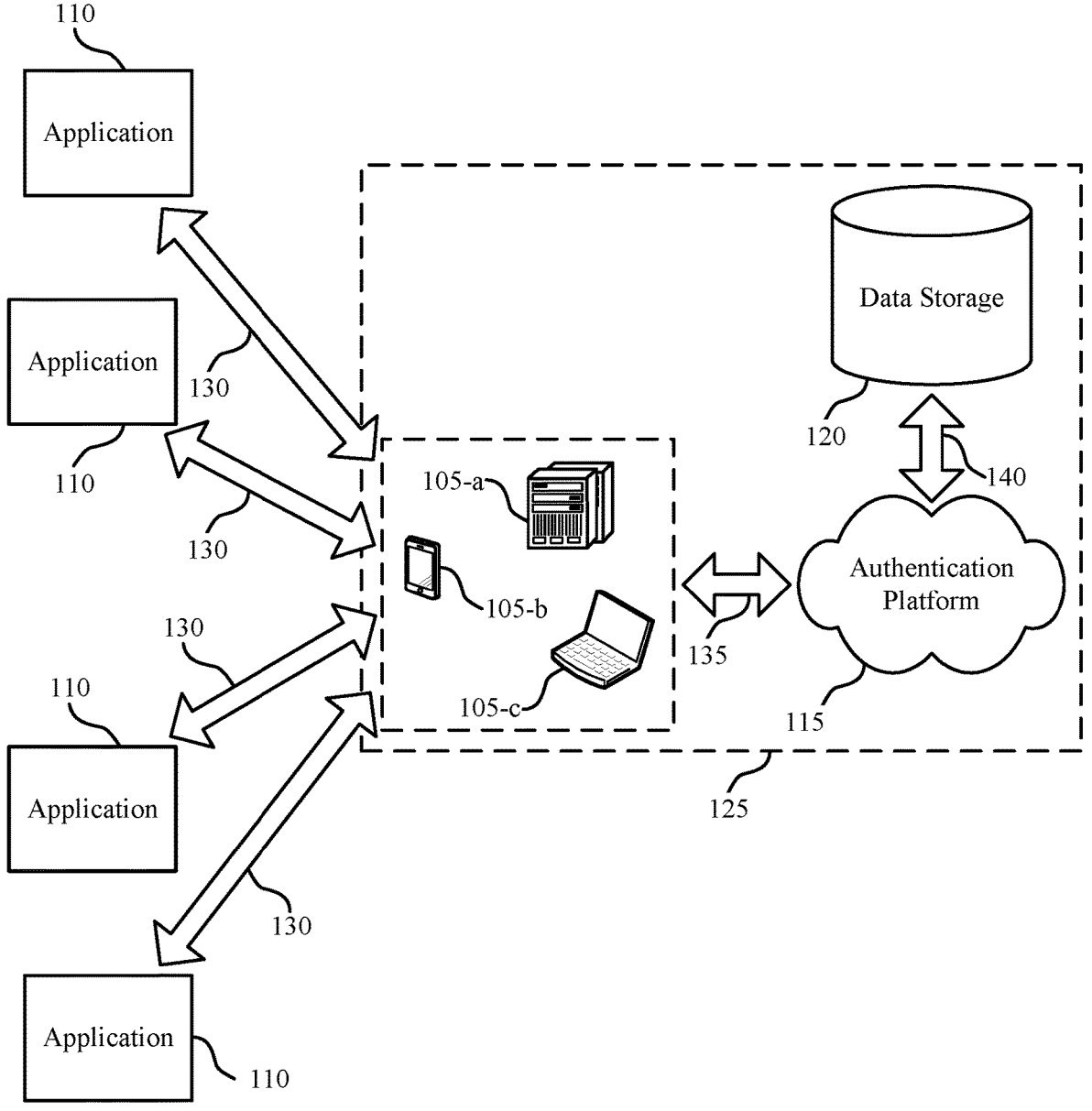
FIG. 1 illustrates an example of a system that supports techniques for access certification reviewer selection in accordance with aspects of the present disclosure.

Some organizations may perform access certifications to review user access privileges to resources, such as software applications, groups, or systems, among other types of resources. For example, the organization may provide users of the organization with access to several different resources and the access may be reviewed (e.g., by the organization) for security purposes, compliance (e.g., Sarbanes-Oxley Act compliance, Health Insurance Portability and Accountability Act compliance, Payment Card Industry compliance), or license management, among other examples. For example, the organization may review user access to a software application to avoid unsuitable (e.g., relatively inappropriate) access to the software application. Additionally, or alternatively, the organization may review user access to the software application to avoid an accumulation of access (e.g., elevated access or privileged access) to the software application unnecessarily. For example, the organization may review user access to remove (e.g., delete, deactivate) old, unused, or relatively inappropriate accounts at the software applications, thereby increasing security and reduce costs associated with licensing the software application.

In some examples, an organization (e.g., a manager of the organization, an owner of the organization, an administrator of the organization) may manually select a reviewer for each user of the organization based on rules (e.g., using use wiki pages or confluence pages). In some cases, however, the rules may be complex and lead to inefficiencies for manual reviewer selection. Additionally, or alternatively, the organization may use a tool, such as an identity governance and administration (IGA) tool, to help manage identity and access privileges for users of the organization. Some IGA tools may help manage identity and access privileges by automatically selecting a reviewer (e.g., a particular user of the organization) to certify access for users of the organization. For example, such IGA tools may select a single reviewer (e.g., a manager of the organization) to certify access to resources for each user of the organization. In some cases, however, the organization may include several users or several resources (or both) and the necessity of certifying access to each resource for each user may impose a considerable burden on the selected reviewer.

Various aspects of the present disclosure relate to techniques for access certification reviewer selection, and more specifically, to techniques for selecting a reviewer based on information associated with users of the organization. For example, the organization (e.g., a user of the organization, a manager of the organization, an owner of the organization, an administrator of the organization) may use a software platform to generate a campaign to certify access to one or more resources for one or more users of the organization. In some examples, as part of generating the campaign (e.g., using the software platform), the organization may determine criteria to be used at the software platform for selecting a suitable reviewer for each user that may have access to the one or more resources (e.g., during a time period associated with the campaign). The criteria may include conditional expressions, such as business logic associated with the software platform.

In some examples, during the time period, the software platform may use the criteria to select a reviewer based on information associated with each user (e.g., user information). For example, the software platform may determine one or more criteria (e.g., of the criteria determined for the campaign) that may be satisfied by respective user information (e.g., a username, a status, a title, a location, the organization, a department, a cost center, a manager) associated with each user. The software platform may use the determined criteria to select a reviewer (e.g., from multiple possible reviewers of the organization) to certify access to the one or more resources for each of the users. For example, the software platform may select a reviewer to certify access to one or more resources for a particular user based on the criteria satisfied by the user information of the user. In some examples, the software platform may transmit a message (e.g., may send an email) to the selected reviewer indicating for the reviewer to certify access to the one or more resources for the users. For example, in response to receiving the message, a reviewer may certify (e.g., approve) or revoke access to each of the one or more resources for the user. Additionally, or alternatively, the reviewer may reassign (e.g., for one or more of the resources) the user to another reviewer. For example, the reviewer may determine (e.g., identify) another reviewer that may be relatively more suitable to review access of the user to one or more of the resources.

Aspects of the subject matter described herein may be implemented to realize one or more of the following potential advantages. For example, the techniques employed by the software platform may provide benefits and enhancements to access certifications, including enabling the software platform to select an access certification reviewer based on user information. In some examples, selecting an access certification reviewer based user information may reduce the risk of unsuitable access to the one or more resources, reduce license costs associated with access to the one or more resources, and improve efficiency of user access review, among other possible benefits. Aspects of the disclosure are initially described in the context of a system for distributed computing. Aspects of the disclosure are also described in the context of a block diagram and a process flow. Aspects of the disclosure are further illustrated by and described with reference to apparatus diagrams, system diagrams, and flowcharts that relate to techniques for access certification reviewer selection.

FIG. 1 illustrates an example of a system 100 for distributed computing (e.g., cloud computing) that supports techniques for access certification reviewer selection in accordance with various aspects of the present disclosure. The system 100 includes client devices 105, applications 110, authentication platform 115, and data storage 120. Authentication platform 115 may be an example of a public or private cloud network. A client device 105 may access authentication platform 115 over network connection 135. The network may implement transmission control protocol and internet protocol (TCP/IP), such as the Internet, or may implement other network protocols. A client device 105 may be an example of a user device, such as a server (e.g., client device 105-$a$), a smartphone (e.g., client device 105-$b$), or a laptop (e.g., client device 105-$c$). In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other organization type.

A client device 105 may interact with multiple applications 110 via one or more interactions 130. The interactions 130 may include digital communications, application programming interface (API) calls, hypertext transfer protocol (HTTP) messages, or any other interaction between a client device 105 and an application 110. Data may be associated with the interactions 130. A client device 105 may access authentication platform 115 to store, manage, and process the data associated with the interactions 130. In some examples, the client device 105 may have an associated security or permission level. A client device 105 may have access to some applications, data, and database information within authentication platform 115 based on the associated security or permission level, and may not have access to others.

Applications 110 may interact with the client device 105 via email, web, text messages, or any other suitable form of interaction. The interaction 130 may be a business-to-business (B2B) interaction or a business-to-consumer (B2C) interaction. An application 110 may also be referred to as a customer, a client, a website, or some other suitable terminology. In some examples, the application 110 may be an example of a server, a node, a compute cluster, or any other type of computing system, component, or environment. In some examples, the application 110 may be operated by a user or group of users.

Authentication platform 115 may offer cloud-based services to the client devices 105, the applications 110, or both. In some examples, authentication platform 115 may support database system such as a multi-tenant database system. In such cases, authentication platform 115 may serve multiple client devices 105 with a single instance of software. However, other types of systems may be implemented, including—but not limited to—client-server systems, mobile device systems, and mobile network systems. Authentication platform 115 may receive data associated with interactions 130 from the client device 105 over network connection 135, and may store and analyze the data. In some examples, authentication platform 115 may receive data directly from an interaction 130 between an application 110 and the client device 105. In some examples, the client device 105 may develop applications to run on authentication platform 115. Authentication platform 115 may be implemented using remote servers. In some examples, the remote servers may be examples of data storage 120.

Data storage 120 may include multiple servers. The multiple servers may be used for data storage, management, and processing. Data storage 120 may receive data from authentication platform 115 via connection 140, or directly from the client device 105 or an interaction 130 between an application 110 and the client device 105. Data storage 120 may utilize multiple redundancies for security purposes. In some examples, the data stored at data storage 120 may be backed up by copies of the data at multiple locations.

Subsystem 125 may include client devices 105, authentication platform 115, and data storage 120. In some examples, data processing may occur at any of the components of subsystem 125, or at a combination of these components. In some examples, servers may perform the data processing. The servers may be a client device 105 or located at data storage 120.

In some examples, a user of a client device 105 may be associated with an organization that may provide the user (e.g., via the client device 105) with access to one or more applications 110 (e.g., one or more resources associated with one or more of the applications 110). In some examples, it may be beneficial for the organization to review the provided access, such as for security purposes or license management. For example, the user may have access to the one or more resources through an account at one or more of the applications 110 that may be old or unused. Additionally, or alternatively, access provided to the user (e.g., to the one or more resources) may be unsuitable, for example due a change of one or more attributes of the user (e.g., user information, such as a status, title, or location of the user). As such, the organization may (e.g., periodically or aperiodically) review user access to resources to increase security and reduce costs associated with providing access to the resources. In some examples, however, managing identity and access privileges for multiple users (e.g., multiple client devices 105) or multiple resources (e.g., multiple applications 110), or both, may impose a considerable burden on the organization. For example, the organization may use wiki pages or confluence pages to manually select a reviewer for each user of the organization based on rules that may be complex and relatively inefficient. Additionally, or alternatively, the organization may use an IGA tool that may select (e.g., task) a single user (e.g., a manager of the users) with reviewing access privileges for each of the multiple users. In some examples, however, reviewer selection using such IGA tools may be inflexible and lead to user access being approved (e.g., certified) automatically without suitable consideration.

As described herein, the subsystem 125 (e.g., a software platform associated with a client device 105, or an authentication platform 115, or both) may be configured to manage identity and access information of client devices 105 (e.g., respective users of the client devices 105). For example, the subsystem 125 (e.g., the authentication platform 115 of the subsystem 125) may identify a suitable reviewer to certify access to the applications 110 (e.g., one or more resources of the applications 110) for each user that may have been provided access to the applications by the organization. In some examples, as part of the access certification process (e.g., using the subsystem 125) the organization may generate a campaign (e.g., an access certification campaign, an audit campaign), in which the organization may determine (e.g., define, select) criteria to be used at the subsystem 125 for selecting reviewers. For example, the organization may define (e.g., using conditional expressions, such as business logic) criteria that may be used to determine a reviewer for a user based on information associated with the user (e.g., a username, a status, a title, a location, the organization, a department, a cost center, a manager). In some examples, the information (e.g., user information) may be stored in the data storage 120, which may be an example of a directory service (e.g., a service capable of mapping user information to a respective user).

The subsystem 125 may compare the criteria (e.g., a portion of the criteria or all of the criteria) with respective user information (e.g., stored in the directory service) of each user. Based on the comparison, the subsystem 125 may determine (e.g., identify) a criterion or multiple criteria that are satisfied by the respective user information for each user. For example, the subsystem 125 may determine which criteria (e.g., of the criteria specified by the organization) may be satisfied by respective user information for each user. The subsystem 125 may select a reviewer (e.g., from multiple possible reviewers of the organization) to certify access to the one or more resources for each of the users based on the satisfied criteria (or criterion). For example, the subsystem 125 may select multiple (e.g., different) reviewers to certify access to multiple (e.g., different) users. As such, the burden imposed on the organization to manage identity and access privileges for multiple users may be shared between the multiple reviewers.

In some examples, an organization may provide access to the applications 110 to a user associated with the client device 105-*a*, a user associated with the client device 105-*b*, and a user associated with the client device 105-*c*. The organization may use the subsystem 125 to generate an access certification campaign to review access to the applications 110 for each of the users. As part of generating the access certification campaign, the organization may determine (e.g., select, define) criteria to be used (e.g., at the subsystem 125) to determine a suitable reviewer for each of the users. For example, the organization may define a first reviewer for users who are a member of a first group, but not a member of second group and a second reviewer for users who are a member of both the first group and the second group. Additionally, or alternatively, the organization may define a third reviewer (e.g., a default reviewer) for users who are not a member of a first group, but are a member of second group or are not a member of either the first group or the second group. In such an example, the subsystem 125 may compare the criteria to the respective user information (e.g., group membership for each user) to select a suitable reviewer for each user. For example, based on the respective group membership for each user, the subsystem 125 may select the first reviewer for the user associated with the client device 105-*a*, the second reviewer for the user associated with the client device 105-*b*, and the third reviewer for the user associated with the client device 105-*c*. In some examples, by selecting a reviewer based on comparing the criteria to user information, the subsystem 125 may reduce the risk of unsuitable access to the applications 110, among other possible benefits.

It should be appreciated by a person skilled in the art that one or more aspects of the disclosure may be implemented in a system 100 to, additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
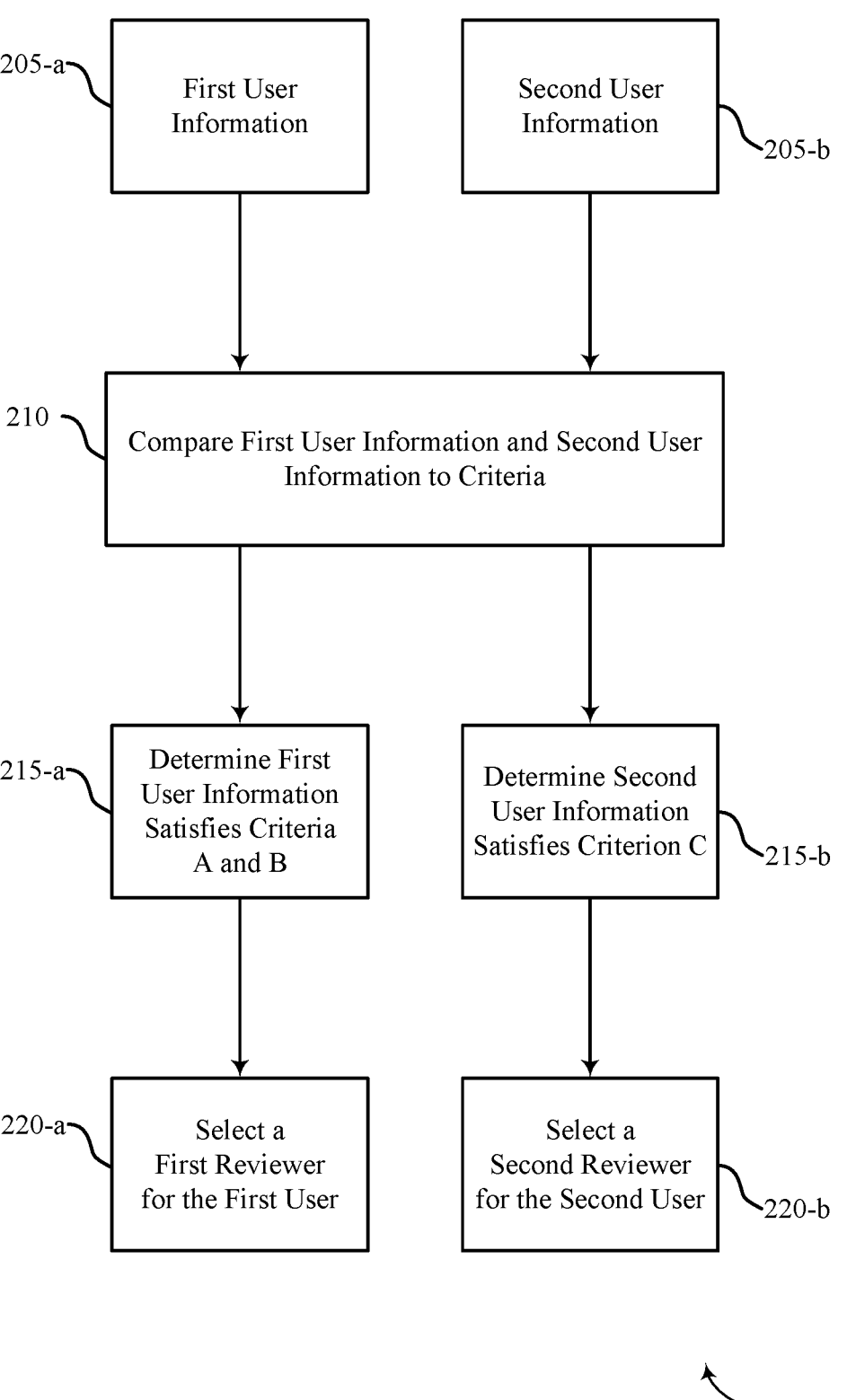
FIG. 2 illustrates an example of a block diagram that supports techniques for access certification reviewer selection in accordance with aspects of the present disclosure.

FIG. 2 illustrates an example of a block diagram 200 that supports techniques for access certification reviewer selection in accordance with aspects of the present disclosure. In some examples, the block diagram 200 may implement or be implemented by aspects of the system 100. For example, the block diagram 200 may be implemented at a software platform, which may be an example of subsystem 125 as described with reference to FIG. 1.

An organization may use IGA tools, to help manage (e.g., audit) identity and access privileges for users of the organization. For example, some IGA tools may perform an audit of user access to resources (e.g., an access certification audit, an access certification campaign), in which the IGA tools may select a single reviewer (e.g., a manager of the organization) to certify access to resource included in the access certification campaign for each user. Such IGA tools may be inflexible and incapable of providing a logic-based approach to define a reviewer for the access certification campaign. That is, rather than enabling the organization (e.g., customer) to create a logic-based approach to define reviewers for an access certification campaign, some IGA tool may either route a review item (e.g., a task to review of access for a user) to a particular reviewer (e.g., another user) or to a manager of the user. In such an example, if the organization includes multiple users or the access certification campaign includes multiple resources to be reviewed (or both), the review process may become burdensome for the reviewer.

In some examples, techniques for access certification reviewer selection, as described herein, may provide one or more enhancements to access certification campaigns. For example, the software platform (e.g., an identity governance tool, an access certifications tool) may provide logic-based reviewer selection for access certifications. For example, the software platform (e.g., with an access certifications tool) may enable an organization to generate (e.g., determine, define, select) criteria (e.g., conditional expressions, such as business logic) that may depend on user information (e.g., user profile attributes, group membership information, location information) to route review items to suitable reviewers during an access certification campaign. For example, using the software platform, the organization may generate custom business logic (or select business logic determined at the software platform) that may depend on user information (e.g., user profile attributes, group membership information, location information) to select a suitable reviewer for each user during the access certification campaign. The business logic (e.g., expression language provided by the software platform) may be based on the user information. For example, the business logic may specify a particular reviewer for users with particular profile attributes or particular group membership. For instance, a user who is a member of a particular group (e.g., a set users) and is located in a particular location (e.g., region, country, state, city) may be assigned (e.g., using the software platform) a particular reviewer.

As illustrated in the example of FIG. 2, a first user and a second user of an organization may have access to one or more resources, such as software applications, groups, servers, other users accounts, service accounts, or devices, among other examples. The first user may be associated with first user information 205-*a* and the second user may be associated with second user information 205-*b*. The first user information 205-*a* and the second user information 205-*b* may include information (e.g., user profile attributes, group information, location information) associated with the first user and the second user, respectively. For example, the first user information 205-*a* and the second user information 205-*b* may include a username, a status, a title, a location, an organization, a department, a cost center (e.g., a unit within an organization to which costs may be charged), a manager, or a combination thereof, of the respective user. In some examples, the organization may use the software platform to generate an access certification campaign to certify access to the one or more resources for the first user and the second user. In some examples, the access certification campaign may be associated with criteria for selecting a reviewer to certify access to the one or more resources for the first user and the second user. For example, the organization may define (e.g., as part of generating the access certification campaign) multiple criteria (e.g., criteria A, B, and C) for selecting a reviewer to certify access to the one or more resources for each of the multiple users.

At 210, the software platform may compare the first user information 205-*a* and the second user information 205-*b* to the multiple criteria (e.g., a portion of the criteria or all of the criteria) associated with the access certification campaign. In some examples, based on the comparison, the software platform may determine one or more criteria (e.g., of the multiple criteria associated with the access certification campaign) that are satisfied by the first user information 205-*a* and one or more criteria that are satisfied by the second user information 205-*b*. For example, at 215-*a*, the software platform may determine that the first user information 205-*a* satisfies criteria A and B. Additionally, or alternatively, at 215-*b*, the software platform may determine that the second user information 205-*b* satisfies criterion C.

At 220-*a*, the software platform may select a first reviewer to review access to the one or more resources for the first user based on the first user information 205-*a* satisfying criteria A and B. Additionally, or alternatively, at 220-*b*, the software platform may select a second reviewer to review access to the one or more resources for the second user based on the second user information 205-*b* satisfying criterion C. In some examples, criterion C may be a default criterion. For example, criterion C may correspond to neither criterion A nor criterion B being satisfied by the second user information 205-*b*. In such an example, the second reviewer may correspond to a default (e.g., fallback) reviewer. That is, the software platform may select a default reviewer (e.g., the second reviewer) from multiple possible reviewers to certify access to the one or more resources for the second user based on the default criterion (e.g., criterion C) being satisfied. Additionally, or alternatively, criterion C may correspond to a reviewer selected for the second user being the second user themselves. For example, in response to determining that a reviewer selected for the second user based on some criteria being satisfied by the second user information 205-*b* includes the second user themselves, the software platform may select the default reviewer (e.g., the second reviewer) to review access to the one or more resources for the second user. In such an example, the default reviewer may be different from the second user. In some examples, selecting the first reviewer and the second reviewer based on respective criteria satisfied by the first user information 205-*a* and the second user information 205-*b* may lead to increased security and protection for the organization and reduce inefficiencies, among other possible benefits.

Figure 3:
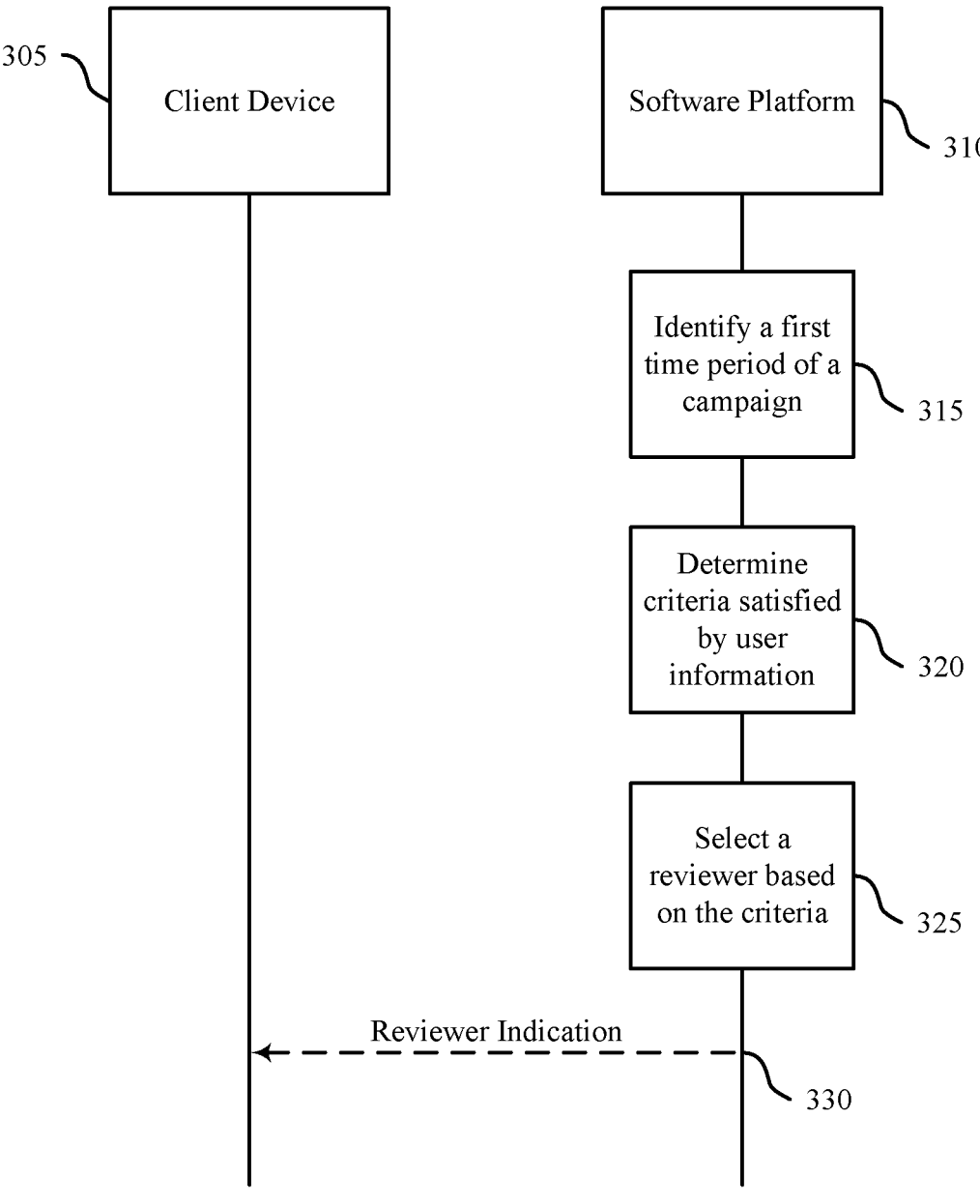
FIG. 3 illustrates an example of a process flow that supports techniques for access certification reviewer selection in accordance with aspects of the present disclosure.

FIG. 3 illustrates an example of a process flow 300 that supports techniques for access certification reviewer selection in accordance with aspects of the present disclosure. In some examples, the process flow 300 may implement aspects of the system 100 and the block diagram 200. For example, the process flow 300 may illustrate operations between a software platform 310 and a client device 305, which may be examples of a subsystem 125 and a client device 105, respectively, as described with reference to FIG. 1. The process flow 300 may be implemented at the software platform 310, the client device 305, or both. In the following description of the process flow 300, the information communicated between the software platform 310 and the client device 305 may be performed in different orders or at different times than shown. Additionally, or alternatively, some operations may be omitted from the process flow 300 and other operations may be added to the process flow 300.

In some examples, the software platform 310 may provide for access certification reviewer selection based on information associated with users of an organization. For example, the organization (e.g., an administrator of the organization) may use the software platform 310 to generate a campaign (e.g., an access certification campaign) to certify access to one or more resources for one or more users of the organization. The one or more resources may include software applications, groups, servers, user and service accounts, and devices, among other examples. In some examples, the access certification campaign may be associated with multiple criteria for selecting a suitable reviewer for each user that may have access to the one or more resources (e.g., during a time period associated with the access certification campaign). For example, the organization (e.g., a user of the organization, a manager of the organization, an owner of the organization, an administrator of the organization) may define the multiple criteria for selecting suitable reviewers using the software platform 310. The criteria may include conditional expressions, such as business logic (e.g., codified business logic), and may be defined (or selected) based on the one or more user resources or the user information (or both), among other examples.

At 315, the software platform 310 may identify a first time period of the access certification campaign to certify access to the one or more resources for a multiple users of the organization. In some examples, each user of the multiple users may have access to at least one resource of the one or more resources during the first time period.

At 320, the software platform 310 may determine, for each user of the multiple users, one or more criteria of the multiple criteria associated with the access certification campaign (e.g., determined for the access certification campaign based on the one or more resources, the user information, or both) that may be satisfied by respective information associated with each user of the multiple users. In some examples, the software platform 310 may determine the one or more criteria (e.g., at 320) based on comparing at least a portion of the respective information associated with each user to at least one criterion of the multiple criteria. The criteria may be stored in a directory service associated with the software platform, another software platform, or the organization, among other examples.

At 325, the software platform 310 may select, for each user of the multiple users, a reviewer from multiple possible reviewers to certify access to the one or more resources for a respective user (e.g., of the multiple users) based on the one or more criteria. In some examples, the selected reviewer may be a default reviewer. For example, the software platform 310 may determine that a default criterion (e.g., of the multiple criteria associated with the access certification campaign) is satisfied by information associated with a user of the multiple users. In some examples, the default criterion may correspond to no criteria associated with the access certification campaign being satisfied by the information associated with the user. Additionally, or alternatively, the default criterion may correspond to the criteria associated with the access certification campaign failing. In such an example, the software platform may select a default reviewer to certify access to the one or more resources for the user based on the default criterion. Additionally, or alternatively, the software platform 310 may select a default reviewer based on determining that the selected reviewer includes the user. In such an example, the default reviewer may be different from the user.

At 330, the software platform 310 may transmit reviewer indication (e.g., a message, an email) indicating, to the selected reviewer (e.g., a user of the organization) via the client device 305, to certify access to the one or more resources for the respective user. In some examples, certifying access to the one or more resources may include approving access to at least one resource of the one or more resources (e.g., providing the user with continued access to the at least one resource), revoking access to at least one resource of the one or more resources (e.g., disabling access to the at least one resources for the user), reassigning a user to another reviewer (e.g., selecting another reviewer for the user that may be relatively more suitable to certify access for the user), or a combination thereof. In some examples, certifying (or revoking) access to the one or more resources may include selecting (or changing) a level of access privileges (e.g., a level of permissions) for the user. In some examples, the reviewer may reassign a user to another reviewer based on information associated with the user (e.g., a username, a status, a title, an organization, a department, a manager), information associated with the one or more resources, access details (e.g., a relatively last time period during which the one or more resources were accessed by the user, a relatively last time period during which access to the one or more resources was reviewed), or any combination thereof.

In some examples, selecting the reviewer based on the one or more criteria determined at 320 may lead to increased security and protection for the organization and reduce inefficiencies, among other possible benefits.

Figure 4:
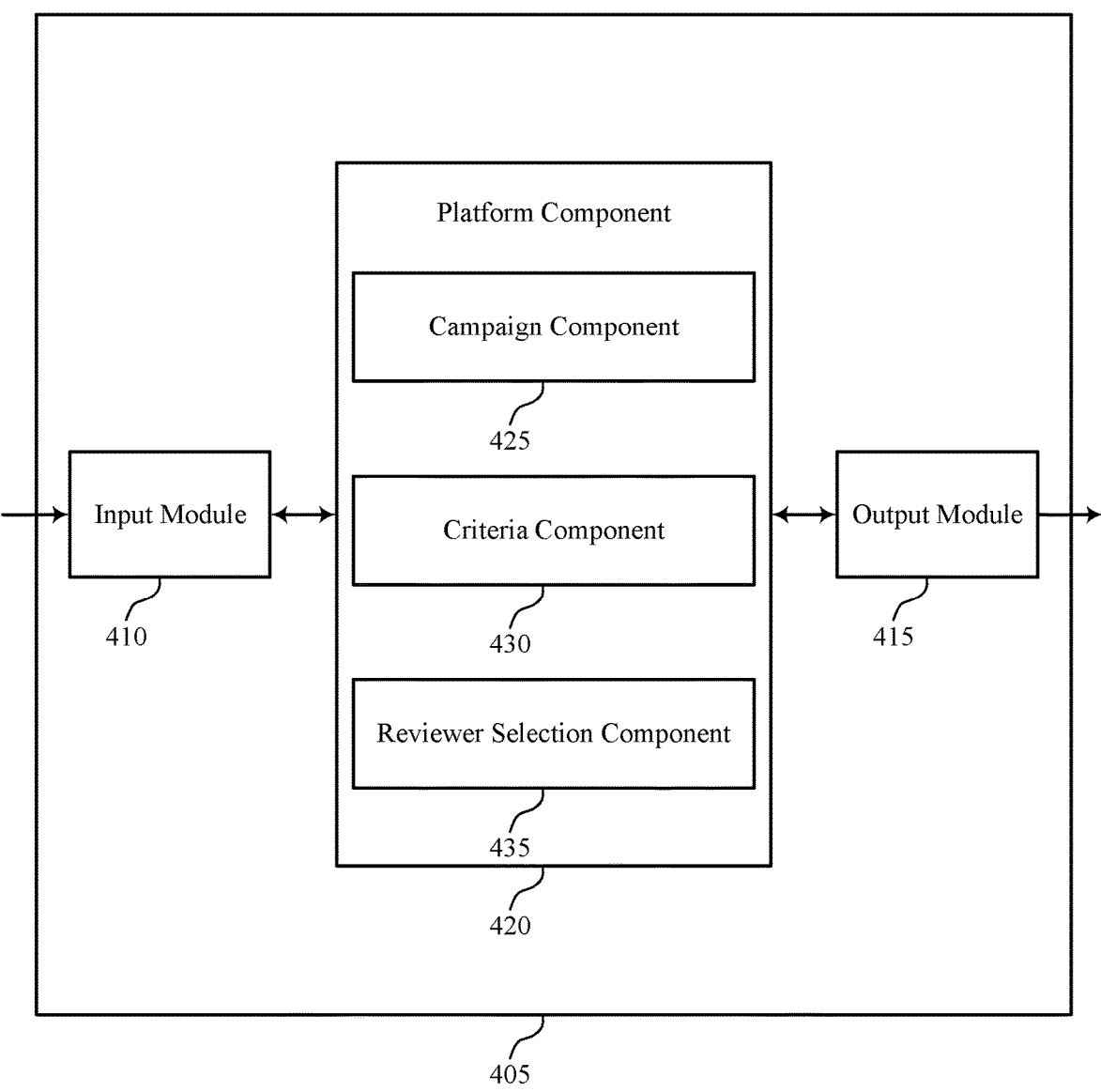
FIG. 4 shows a block diagram of an apparatus that supports techniques for access certification reviewer selection in accordance with aspects of the present disclosure.

FIG. 4 shows a block diagram 400 of a device 405 that supports techniques for access certification reviewer selection in accordance with aspects of the present disclosure. The device 405 may include an input module 410, an output module 415, and a platform component 420. The device 405 may also include a processor. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some examples, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the platform component 420 to support techniques for access certification reviewer selection. In some examples, the input module 410 may be a component of an I/O controller 610 as described with reference to FIG. 6.

The output module 415 may manage output signals for the device 405. For example, the output module 415 may receive signals from other components of the device 405, such as the platform component 420, and may transmit these signals to other components or devices. In some examples, the output module 415 may transmit output signals for display in a user interface, for storage in a database or data store, for further processing at a server or server cluster, or for any other processes at any number of devices or systems. In some examples, the output module 415 may be a component of an I/O controller 610 as described with reference to FIG. 6.

For example, the platform component 420 may include a campaign component 425, a criteria component 430, a reviewer selection component 435, or any combination thereof. In some examples, the platform component 420, or various components thereof, may be configured to perform various operations (e.g., receiving, monitoring, transmitting) using or otherwise in cooperation with the input module 410, the output module 415, or both. For example, the platform component 420 may receive information from the input module 410, send information to the output module 415, or be integrated in combination with the input module 410, the output module 415, or both to receive information, transmit information, or perform various other operations as described herein.

The platform component 420 may support access management in accordance with examples as disclosed herein. The campaign component 425 may be configured as or otherwise support a means for identifying a first time period of a campaign to certify access to one or more resources for a set of multiple users. The criteria component 430 may be configured as or otherwise support a means for determining, for each user of the set of multiple users, one or more criteria of a set of multiple criteria associated with the campaign that are satisfied by respective information associated with each user of the set of multiple users. The reviewer selection component 435 may be configured as or otherwise support a means for selecting, for each user of the set of multiple users, a reviewer from a set of multiple reviewers to certify access to the one or more resources for a respective user based on the one or more criteria.

Figure 5:
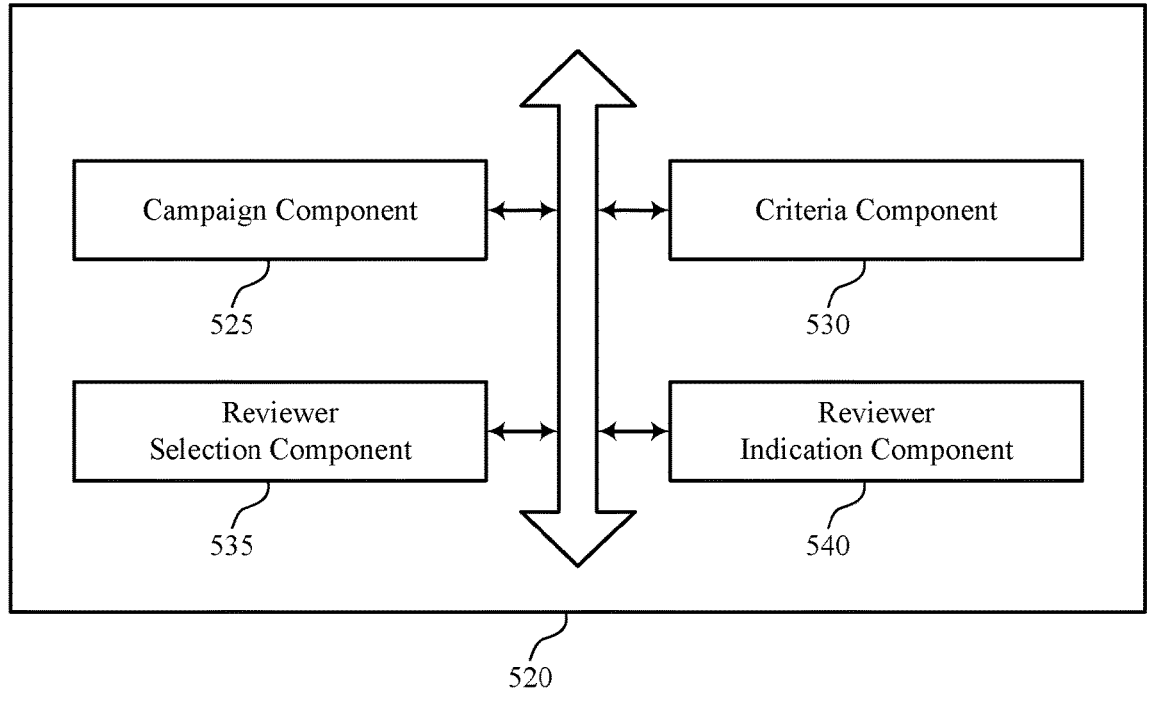
FIG. 5 shows a block diagram of a platform component that supports techniques for access certification reviewer selection in accordance with aspects of the present disclosure.

FIG. 5 shows a block diagram 500 of a platform component 520 that supports techniques for access certification reviewer selection in accordance with aspects of the present disclosure. The platform component 520 may be an example of aspects of a software platform or a platform component 420, or both, as described herein. The platform component 520, or various components thereof, may be an example of means for performing various aspects of techniques for access certification reviewer selection as described herein. For example, the platform component 520 may include a campaign component 525, a criteria component 530, a reviewer indication component 535, a reviewer indication component 540, or any combination thereof. Each of these components may communicate, directly or indirectly, with one another (e.g., via one or more buses).

The platform component 520 may support access management in accordance with examples as disclosed herein. The campaign component 525 may be configured as or otherwise support a means for identifying a first time period of a campaign to certify access to one or more resources for a set of multiple users. The criteria component 530 may be configured as or otherwise support a means for determining, for each user of the set of multiple users, one or more criteria of a set of multiple criteria associated with the campaign that are satisfied by respective information associated with each user of the set of multiple users. The reviewer selection component 535 may be configured as or otherwise support a means for selecting, for each user of the set of multiple users, a reviewer from a set of multiple reviewers to certify access to the one or more resources for a respective user based on the one or more criteria.

In some examples, to support determining the one or more criteria, the criteria component 530 may be configured as or otherwise support a means for comparing at least a portion of the respective information associated with each user of the set of multiple users to at least one criterion of the set of multiple criteria. In some examples, each criterion of the set of multiple criteria includes a conditional expression. In some examples, the conditional expression includes business logic.

In some examples, the criteria component 530 may be configured as or otherwise support a means for determining that a default criterion of the set of multiple criteria associated with the campaign is satisfied by information associated with a user of the set of multiple users. In some examples, the reviewer selection component 535 may be configured as or otherwise support a means for selecting, for the user, a default reviewer from the set of multiple reviewers to certify access to the one or more resources for the user based on the default criterion.

In some examples, to support determining that the default criterion is satisfied by the information associated with the user, the reviewer selection component 535 may be configured as or otherwise support a means for determining that the selected reviewer includes the user, where selecting the default reviewer is based on the determination, and where the default reviewer is different from the user.

In some examples, the reviewer indication component 540 may be configured as or otherwise support a means for transmitting a message indicating, to the selected reviewer, to certify access to the one or more resources for the respective user. In some examples, certifying access to the one or more resources includes approving access to at least one resource of the one or more resources, revoking access to at least one resource of the one or more resources, reassigning a user to another reviewer, or a combination thereof.

In some examples, the respective information associated with each user of the set of multiple users includes a username of the respective user, a status of the respective user, a title of the respective user, a location associated with the respective user, an organization associated with the respective user, a department associated with the respective user, a cost center associated with the respective user, a manager of the respective user, or a combination thereof. In some examples, the respective information associated with each user of the set of multiple users is stored in a directory service. In some examples, each user of the set of multiple users has access to at least one resource of the one or more resources during the first time period.

Figure 6:
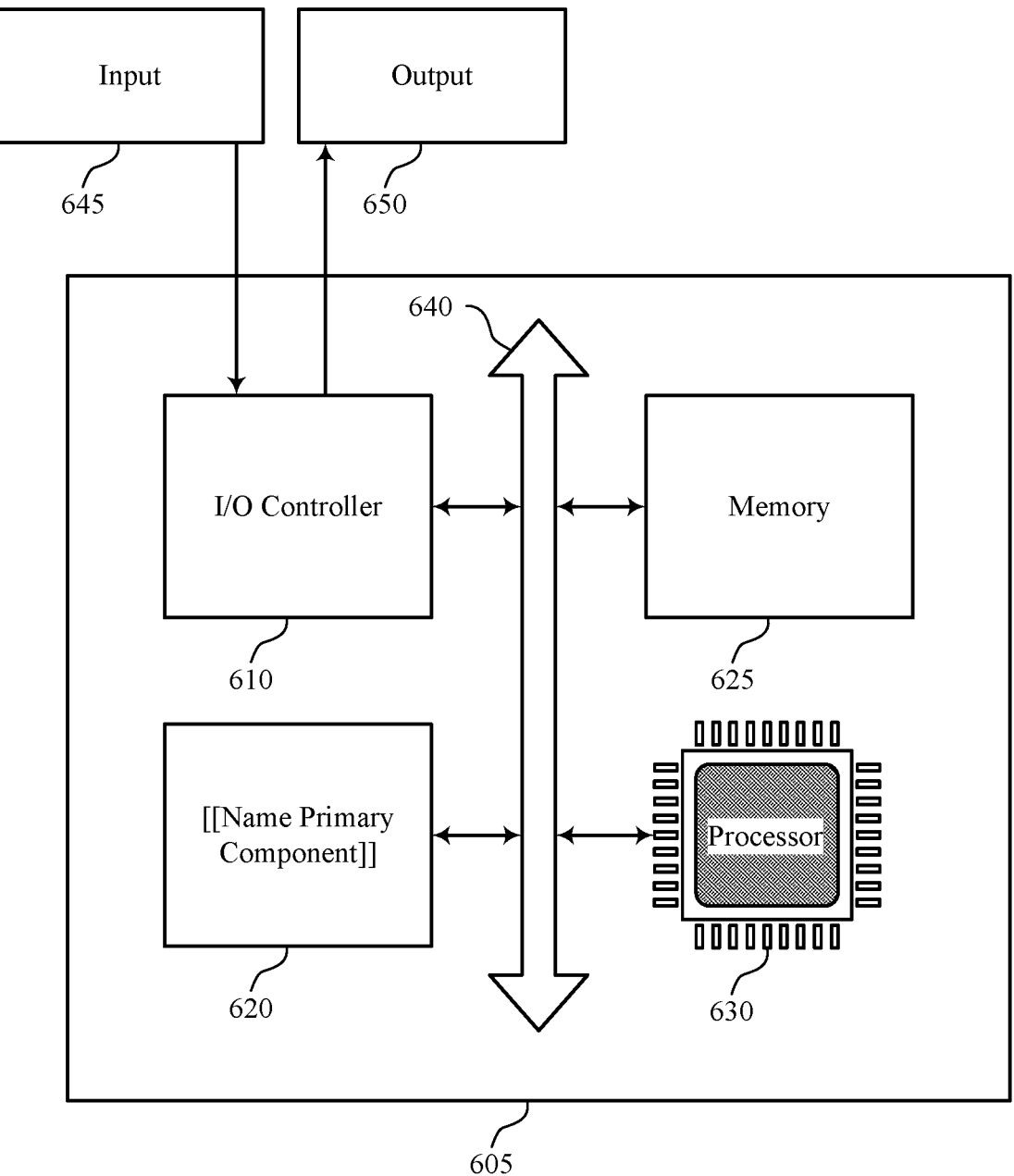
FIG. 6 shows a diagram of a system including a device that supports techniques for access certification reviewer selection in accordance with aspects of the present disclosure.

FIG. 6 shows a diagram of a system 600 including a device 605 that supports techniques for access certification reviewer selection in accordance with aspects of the present disclosure. The device 605 may be an example of or include the components of a device 405 as described herein. The device 605 may include components for bi-directional data communications including components for transmitting and receiving communications, such as a platform component 620, an I/O controller 610, a memory 625, and a processor 630. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some examples, the I/O controller 610 may represent a physical connection or port to an external peripheral. In some examples, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some examples, the I/O controller 610 may be implemented as part of a processor 630. In some examples, a user may interact with the device 605 via the I/O controller 610 or via hardware components controlled by the I/O controller 610.

Memory 625 may include random-access memory (RAM) and ROM. The memory 625 may store computer-readable, computer-executable software including instructions that, when executed, cause the processor 630 to perform various functions described herein. In some examples, the memory 625 may contain, among other things, a BIOS which may control basic hardware or software operation such as the interaction with peripheral components or devices.

The processor 630 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting techniques for access certification reviewer selection).

The platform component 620 may support access management in accordance with examples as disclosed herein. For example, the platform component 620 may be configured as or otherwise support a means for identifying a first time period of a campaign to certify access to one or more resources for a set of multiple users. The platform component 620 may be configured as or otherwise support a means for determining, for each user of the set of multiple users, one or more criteria of a set of multiple criteria associated with the campaign that are satisfied by respective information associated with each user of the set of multiple users. The platform component 620 may be configured as or otherwise support a means for selecting, for each user of the set of multiple users, a reviewer from a set of multiple reviewers to certify access to the one or more resources for a respective user based on the one or more criteria.

By including or configuring the platform component 620 in accordance with examples as described herein, the device 605 may support techniques for reduced latency and improved user experience related to reduced processing.

FIG. 7 shows a flowchart illustrating a method 700 that supports techniques for access certification reviewer selection in accordance with aspects of the present disclosure. The operations of the method 700 may be implemented by a software platform or its components as described herein. For example, the operations of the method 700 may be performed by a software platform as described with reference to FIGS. 1 through 6. In some examples, a software platform may execute a set of instructions to control the functional elements of the software platform to perform the described functions. Additionally, or alternatively, the software platform may perform aspects of the described functions using special-purpose hardware.

At 705, the method may include identifying a first time period of a campaign to certify access to one or more resources for a set of multiple users. The operations of 705 may be performed in accordance with examples as disclosed herein. In some examples, aspects of the operations of 705 may be performed by a campaign component 525 as described with reference to FIG. 5.

At 710, the method may include determining, for each user of the set of multiple users, one or more criteria of a set of multiple criteria associated with the campaign that are satisfied by respective information associated with each user of the set of multiple users. The operations of 710 may be performed in accordance with examples as disclosed herein. In some examples, aspects of the operations of 710 may be performed by a criteria component 530 as described with reference to FIG. 5.

At 715, the method may include selecting, for each user of the set of multiple users, a reviewer from a set of multiple reviewers to certify access to the one or more resources for a respective user based on the one or more criteria. The operations of 715 may be performed in accordance with examples as disclosed herein. In some examples, aspects of the operations of 715 may be performed by a reviewer selection component 535 as described with reference to FIG. 5.

A method for access management is described. The method may include identifying a first time period of a campaign to certify access to one or more resources for a set of multiple users, determining, for each user of the set of multiple users, one or more criteria of a set of multiple criteria associated with the campaign that are satisfied by respective information associated with each user of the set of multiple users, and selecting, for each user of the set of multiple users, a reviewer from a set of multiple reviewers to certify access to the one or more resources for a respective user based on the one or more criteria.

An apparatus for access management is described. The apparatus may include a processor, memory coupled with the processor, and instructions stored in the memory. The instructions may be executable by the processor to cause the apparatus to identify a first time period of a campaign to certify access to one or more resources for a set of multiple users, determine, for each user of the set of multiple users, one or more criteria of a set of multiple criteria associated with the campaign that are satisfied by respective information associated with each user of the set of multiple users, and select, for each user of the set of multiple users, a reviewer from a set of multiple reviewers to certify access to the one or more resources for a respective user based on the one or more criteria.

Another apparatus for access management is described. The apparatus may include means for identifying a first time period of a campaign to certify access to one or more resources for a set of multiple users, means for determining, for each user of the set of multiple users, one or more criteria of a set of multiple criteria associated with the campaign that are satisfied by respective information associated with each user of the set of multiple users, and means for selecting, for each user of the set of multiple users, a reviewer from a set of multiple reviewers to certify access to the one or more resources for a respective user based on the one or more criteria.

A non-transitory computer-readable medium storing code for access management is described. The code may include instructions executable by a processor to identify a first time period of a campaign to certify access to one or more resources for a set of multiple users, determine, for each user of the set of multiple users, one or more criteria of a set of multiple criteria associated with the campaign that are satisfied by respective information associated with each user of the set of multiple users, and select, for each user of the set of multiple users, a reviewer from a set of multiple reviewers to certify access to the one or more resources for a respective user based on the one or more criteria.

In some examples of the method, apparatuses, and non-transitory computer-readable medium described herein, determining the one or more criteria may include operations, features, means, or instructions for comparing at least a portion of the respective information associated with each user of the set of multiple users to at least one criterion of the set of multiple criteria.

In some examples of the method, apparatuses, and non-transitory computer-readable medium described herein, each criterion of the set of multiple criteria includes a conditional expression.

In some examples of the method, apparatuses, and non-transitory computer-readable medium described herein, the conditional expression includes business logic.

Some examples of the method, apparatuses, and non-transitory computer-readable medium described herein may further include operations, features, means, or instructions for determining that a default criterion of the set of multiple criteria associated with the campaign may be satisfied by information associated with a user of the set of multiple users and selecting, for the user, a default reviewer from the set of multiple reviewers to certify access to the one or more resources for the user based on the default criterion.

In some examples of the method, apparatuses, and non-transitory computer-readable medium described herein, determining that the default criterion may be satisfied by the information associated with the user may include operations, features, means, or instructions for determining that the selected reviewer includes the user, where selecting the default reviewer may be based on the determination, and where the default reviewer may be different from the user.

Some examples of the method, apparatuses, and non-transitory computer-readable medium described herein may further include operations, features, means, or instructions for transmitting a message indicating, to the selected reviewer, to certify access to the one or more resources for the respective user.

Some examples of the method, apparatuses, and non-transitory computer-readable medium described herein may further include operations, features, means, or instructions for certifying access to the one or more resources includes approving access to at least one resource of the one or more resources, revoking access to at least one resource of the one or more resources, reassigning a user to another reviewer, or a combination thereof.

In some examples of the method, apparatuses, and non-transitory computer-readable medium described herein, the respective information associated with each user of the set of multiple users includes a username of the respective user, a status of the respective user, a title of the respective user, a location associated with the respective user, an organization associated with the respective user, a department associated with the respective user, a cost center associated with the respective user, a manager of the respective user, or a combination thereof.

In some examples of the method, apparatuses, and non-transitory computer-readable medium described herein, the respective information associated with each user of the set of multiple users may be stored in a directory service.

In some examples of the method, apparatuses, and non-transitory computer-readable medium described herein, each user of the set of multiple users may have access to at least one resource of the one or more resources during the first time period.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for access management, comprising:

identifying a first time period of a campaign to certify access to one or more resources for a plurality of users;

determining, for a first user of the plurality of users that is associated with a first set of user information indicating a first set of user profile attributes, that one or more user profile attributes of the first set of user profile attributes of the first user satisfies a first criteria of a plurality of criteria associated with the campaign and a second criteria of the plurality of criteria associated with the campaign, the second criteria being different than the first criteria;

determining, for a second user of the plurality of users that is associated with a second set of user information indicating a second set of user profile attributes, that the one or more user profile attributes of the second set of user profile attributes of the second user satisfies a third criteria of the plurality of criteria associated with the campaign, the third criteria being different than both the first criteria and the second criteria, wherein the third criteria is indicative of a lack of satisfaction of the first criteria and the second criteria;

selecting, for the first user of the plurality of users, a first reviewer from a plurality of reviewers to certify access to the one or more resources for the first user based at least in part on the first criteria and the second criteria being satisfied by the one or more user profile attributes indicated via the first set of user information for the first user, wherein selection of the first reviewer is based at least in part on the first reviewer being associated with both the first criteria and the second criteria that are satisfied by the one or more user profile attributes associated with the first user; and selecting, for the second user of the plurality of users, a second reviewer from the plurality of reviewers to certify access to the one or more resources for the second user based at least in part on the third criteria being satisfied by the one or more user profile attributes indicated via the second set of user information for the second user, the second reviewer being different than the first reviewer, wherein the selection of the second reviewer is based at least in part on the second reviewer being associated with the third criteria that is satisfied by the one or more user profile attributes associated with the second user.

2. The method of claim 1, wherein determining that the first criteria and the second criteria are satisfied and that the third criteria is satisfied comprises:

comparing, for the first user, at least a portion of the first set of user profile attributes indicated via the first set of user information associated with the first user of the plurality of users to the first criteria and the second criteria of the plurality of criteria; and comparing, for the second user, at least a portion of the second set of user profile attributes indicated via the second set of user information associated with the second user of the plurality of users to the first criteria, the second criteria, and the third criteria of the plurality of criteria.

3. The method of claim 1, wherein each criterion of the plurality of criteria comprises a conditional expression.

4. The method of claim 3, wherein the conditional expression comprises business logic.

5. The method of claim 1, further comprising:

determining that a default criterion of the plurality of criteria associated with the campaign is satisfied by at least one user profile attribute of a third set of user profile attributes indicated via a third set of user information associated with a third user of the plurality of users; and selecting, for the third user, a default reviewer from the plurality of reviewers to certify access to the one or more resources for the third user based at least in part on the default criterion, wherein selection of the default reviewer is based at least in part on the default reviewer being associated with the default criterion that is satisfied by the at least one user profile attribute of the third set of user profile attributes indicated via the third set of user information associated with the third user.

6. The method of claim 5, wherein determining that the default criterion is satisfied by the third set of user information associated with the third user comprises:

determining that a respective selected reviewer comprises the third user, wherein selecting the default reviewer is based at least in part on the determination, and wherein the default reviewer is different from the first user, the second user, or both.

7. The method of claim 1, further comprising:

transmitting, to a respective selected reviewer, a message indicating the respective selected reviewer to certify access to the one or more resources for a respective user that is associated with a respective one or more criteria of the plurality of criteria that is satisfied by the one or more user profile attributes associated with the respective user.

8. The method of claim 1, wherein certifying access to the one or more resources comprises approving access to at least one resource of the one or more resources, revoking access to at least one resource of the one or more resources, reassigning a respective user to another reviewer, or a combination thereof.

9. The method of claim 1, wherein a respective set of user profile attributes indicated via a respective set of user information associated with a respective user of the plurality of users comprises a username of the respective user, a status of the respective user, a title of the respective user, a location associated with the respective user, an organization associated with the respective user, a department associated with the respective user, a cost center associated with the respective user, a manager of the respective user, or any combination thereof.

10. The method of claim 1, wherein a respective set of user information associated with a respective user of the plurality of users is stored in a directory service.

11. The method of claim 1, wherein the first user of the plurality of users has access to at least one resource of the one or more resources during the first time period, the second user of the plurality of users has access to at least one resource of the one or more resources during the first time period, or a combination thereof.

12. An apparatus for access management, comprising:

a processor;

memory coupled with the processor; and instructions stored in the memory and executable by the processor to cause the apparatus to:

identify a first time period of a campaign to certify access to one or more resources for a plurality of users;

determine, for a first user of the plurality of users that is associated with a first set of user information indicating a first set of user profile attributes, that one or more user profile attributes of the first set of user profile attributes of the first user satisfies a first criteria of a plurality of criteria associated with the campaign and a second criteria of the plurality of criteria associated with the campaign, the second criteria being different than the first criteria;

determine, for a second user of the plurality of users that is associated with a second set of user information indicating a second set of user profile attributes, that the one or more user profile attributes of the second set of user profile attributes of the second user satisfies a third criteria of the plurality of criteria associated with the campaign, the third criteria being different than both the first criteria and the second criteria, wherein the third criteria is indicative of a lack of satisfaction of the first criteria and the second criteria;

select, for the first user of the plurality of users, a first reviewer from a plurality of reviewers to certify access to the one or more resources for the first user based at least in part on the first criteria and the second criteria being satisfied by the one or more user profile attributes indicated via the first set of user information for the first user, wherein selection of the first reviewer is based at least in part on the first reviewer being associated with both the first criteria and the second criteria that are satisfied by the one or more user profile attributes associated with the first user; and select, for the second user of the plurality of users, a second reviewer from the plurality of reviewers to certify access to the one or more resources for the second user based at least in part on the third criteria being satisfied by the one or more user profile attributes indicated via the second set of user information for the second user, the second reviewer being different than the first reviewer, wherein the selection of the second reviewer is based at least in part on the second reviewer being associated with the third criteria that is satisfied by the one or more user profile attributes associated with the second user.

13. The apparatus of claim 12, wherein the instructions to determine that the first criteria and the second criteria are satisfied and that the third criteria is satisfied are executable by the processor to cause the apparatus to:

compare, for the first user, at least a portion of the first set of user profile attributes indicated via the first set of user information associated with the first user of the plurality of users to the first criteria and the second criteria of the plurality of criteria; and compare, for the second user, at least a portion of the second set of user profile attributes indicated via the second set of user information associated with the second user of the plurality of users to the first criteria, the second criteria, and the third criteria of the plurality of criteria.

14. The apparatus of claim 12, wherein each criterion of the plurality of criteria comprises a conditional expression.

15. The apparatus of claim 14, wherein the conditional expression comprises business logic.

16. The apparatus of claim 12, wherein the instructions are further executable by the processor to cause the apparatus to:

determine that a default criterion of the plurality of criteria associated with the campaign is satisfied by at least one user profile attribute of a third set of user profile attributes indicated via a third set of user information associated with a third user of the plurality of users; and select, for the third user, a default reviewer from the plurality of reviewers to certify access to the one or more resources for the third user based at least in part on the default criterion, wherein selection of the default reviewer is based at least in part on the default reviewer being associated with the default criterion that is satisfied by the at least one user profile attribute of the third set of user profile attributes indicated via the third set of user information associated with the third user.

17. The apparatus of claim 16, wherein the instructions to determine that the default criterion is satisfied by the third set of user information associated with the third user are executable by the processor to cause the apparatus to:

determine that a respective selected reviewer comprises the third user, wherein selecting the default reviewer is based at least in part on the determination, and wherein the default reviewer is different from the first user, the second user, or both.

18. The apparatus of claim 12, wherein the instructions are further executable by the processor to cause the apparatus to:

transmit, to a respective selected reviewer, a message indicating the respective selected reviewer to certify access to the one or more resources for a respective user that is associated with a respective one or more criteria of the plurality of criteria that is satisfied by the one or more user profile attributes associated with the respective user.

19. The apparatus of claim 12, wherein certifying access to the one or more resources comprises approving access to at least one resource of the one or more resources, revoking access to at least one resource of the one or more resources, reassigning a respective user to another reviewer, or a combination thereof.

20. The apparatus of claim 12, wherein a respective set of user profile attributes indicated via a respective user information associated with a respective user of the plurality of users comprises a username of the respective user, a status of the respective user, a title of the respective user, a location associated with the respective user, an organization associated with the respective user, a department associated with the respective user, a cost center associated with the respective user, a manager of the respective user, or any combination thereof.

\* \* \* \* \*